(12) United States Patent
Ait Aoudia et al.

(10) Patent No.: US 12,081,324 B2
(45) Date of Patent: Sep. 3, 2024

(54) TRANSMITTER ALGORITHM

(71) Applicant: Nokia Technologies Oy, Espoo (FI)

(72) Inventors: Faycal Ait Aoudia, Saint Cloud (FR); Maximilian Stark, Massy (FR); Jakob Hoydis, Paris (FR)

(73) Assignee: Nokia Technologies Oy, Espoo (FI)

( * ) Notice: Subject to any disclaimer, the term of this patent is extended or adjusted under 35 U.S.C. 154(b) by 292 days.

(21) Appl. No.: 17/621,747

(22) PCT Filed: Jun. 27, 2019

(86) PCT No.: PCT/EP2019/067267
§ 371 (c)(1),
(2) Date: Dec. 22, 2021

(87) PCT Pub. No.: WO2020/259845
PCT Pub. Date: Dec. 30, 2020

(65) Prior Publication Data
US 2022/0263596 A1    Aug. 18, 2022

(51) Int. Cl.
*H04L 1/00*    (2006.01)
*G06N 3/04*    (2023.01)
(Continued)

(52) U.S. Cl.
CPC .......... *H04L 1/0002* (2013.01); *G06N 3/045* (2023.01); *G06N 3/047* (2023.01); *G06N 3/08* (2013.01); *H04L 25/49* (2013.01)

(58) Field of Classification Search
CPC .......... G06N 3/08; G06N 3/047; G06N 3/045; G06N 20/00; G06N 3/02; G06N 3/0455;
(Continued)

(56) References Cited

U.S. PATENT DOCUMENTS 4,562,426 A * 12/1985 Forney, Jr. .......... H04L 27/3438
375/240
2004/0181497 A1    9/2004 Dodgson ........................ 706/23
(Continued)

FOREIGN PATENT DOCUMENTS

CA    2608846 A1    11/2006
CN    102265546 A    11/2011
(Continued)

OTHER PUBLICATIONS

Ye, Neng, et al., "Deep Learning Aided Grant-Free NOMA Toward Reliable Low-Latency Access in Tactile Internet of Things", IEEE Transactions on Industrial Informatics, Jan. 2019, vol. 15, No. 5, pp. 2995-3005.
(Continued)

*Primary Examiner* — Maharishi V Khirodhar
*Assistant Examiner* — Kenneth P Hunt
(74) *Attorney, Agent, or Firm* — Joseph C. Drish; Harrington & Smith (57) ABSTRACT

An apparatus, method and computer program is described including circuitry configured for using a transmitter algorithm to convert one or more inputs at a transmitter of a transmission system into one or more data symbols, wherein: the transmission system includes the transmitter implementing said transmitter algorithm, a channel and a receiver including a receiver algorithm; the transmitter algorithm includes trainable parameters for converting one or more received data symbols into one or more outputs; and the transmitter algorithm is stochastic.

19 Claims, 8 Drawing Sheets

(51) Int. Cl.
*G06N 3/045* (2023.01)
*G06N 3/047* (2023.01)
*G06N 3/08* (2023.01)
*H04L 25/49* (2006.01)

(58) Field of Classification Search
CPC .... G06N 3/084; G06N 3/20; G06N 3/00–105; H04L 25/497; H04L 1/0002; H04L 25/49
See application file for complete search history.

(56) References Cited

U.S. PATENT DOCUMENTS

| | | | |
|---|---|---|---|
| 2019/0188402 A1 | 6/2019 | Wang et al. | |
| 2020/0382929 A1* | 12/2020 | Shi | G06N 3/063 |
| 2021/0319286 A1* | 10/2021 | Gunduz | H04N 19/30 |

FOREIGN PATENT DOCUMENTS

| | | |
|---|---|---|
| CN | 109600335 A | 4/2019 |
| JP | 2000504548 | 4/2000 |
| JP | 2004350259 A | 12/2004 |
| JP | 2015530835 A | 10/2015 |
| WO | WO 2019/080987 A1 | 5/2019 |
| WO | WO 2019/080988 A1 | 5/2019 |

OTHER PUBLICATIONS

O'Shea, Timothy, et al., "An Introduction to Deep Learning for the Physical Layer", IEEE Transactions on Cognitive Communications and Networking, Oct. 2017, vol. 3, No. 4, pp. 563-575.
Aoudia, Faycal Ait, et al., End-to-End Learning of Communications Systems Without a ChannelModel, 2018 52nd Asilomar Conference on Signals, Systems, and Computers, Feb. 21, 2019, pp. 298-303.
Ait Aoudia, Faycal, et al., "End-to-End Learning of Communications Systems without a Channel Model", Apr. 2018, abstract only.
O'Shea, Timothy J., et al., "Deep Learning Based MIMO Communications", Jul. 2017, abstract only.
"Link Abstraction method for SLML Receiver", Samsung, 3GPP TSG-RAN WG1#74bis, R1-134196, Oct. 2013, 8 pages.

* cited by examiner

TRANSMITTER ALGORITHM

CROSS REFERENCE TO RELATED APPLICATION

This patent application is a U.S. National Stage application of International Patent Application Number PCT/EP2019/067267 filed Jun. 27, 2019, which is hereby incorporated by reference in its entirety.

FIELD

The present specification relates to transmitter algorithms.

BACKGROUND

A simple communications system includes a transmitter (including a transmitter algorithm), a transmission channel, and a receiver (including a receiver algorithm). Although developments have been made, there remains scope for further developments in this area.

SUMMARY

In a first aspect, this specification describes an apparatus comprising means for using a transmitter algorithm to convert one or more inputs at a transmitter of a transmission system into one or more data symbols, wherein: the transmission system comprises the transmitter implementing said transmitter algorithm (e.g. as part of a bits-to-symbols mapper), a channel and a receiver including a receiver algorithm (e.g. implementing a demapper); the transmitter algorithm comprises trainable parameters for converting one or more received data symbols into one or more outputs; and the transmitter algorithm is stochastic. Some embodiments further comprise means for generating updated parameters of the transmission system in order to maximise an information transfer rate. The transmitter may comprise a transmitter neural network configured to implement the said transmitter algorithm. Alternatively, or in addition, the receiver may comprise a receiver neural network configured to implement said receiver algorithm.

In a second aspect, this specification describes an apparatus comprising: means for initialising trainable parameters of a transmission system, wherein the transmission system comprises a transmitter, a channel and a receiver, wherein the transmitter includes a transmitter algorithm (e.g. as part of a bits-to-symbols mapper) for converting one or more inputs into one or more data symbols (symbols for transmission) and the receiver algorithm includes a receiver algorithm (e.g. implementing a demapper) for converting one or more received data symbols into one or more outputs, wherein the transmitter algorithm is stochastic; means for generating updated parameters of the transmission system in order to maximise an information transfer rate, wherein generating updated parameters of the transmission system includes updating trainable parameters of the transmitter algorithm; and means for repeating the generating updated parameters of the transmission system until a first condition is reached (e.g. a defined performance level or a defined number of iterations). The said means for initialising the trainable parameters of the transmission system may initialise said trainable parameters randomly. The transmitter may comprise a transmitter neural network configured to implement the said transmitter algorithm. Alternatively, or in addition, the receiver may comprise a receiver neural network configured to implement said receiver algorithm.

In some embodiments, the means for generating updated parameters of the transmission system is configured to generate said parameters in order to minimise a divergence (e.g. using Kullback-Leibler divergence) between a distribution function defining a probability that individual data symbols are output by the transmitter algorithm and a target distribution. The distribution function may approximate a desired function.

Some embodiments further comprise means for generating a loss function, wherein the means for generating updated parameters of the transmission system is configured to minimise said loss function. Moreover, some embodiments further comprise: means for generating one or more data symbols for transmission from said transmitter to said receiver; means for observing channel outputs at said receiver in response to transmitting said data symbols; and means for minimising said loss function on the basis of said observed channel outputs.

In embodiments comprising a loss function, the loss function may be based (at least in part) on a first variable minus a second variable. The said first variable may comprise a/the divergence between a distribution function defining a probability that individual data symbols are output by the transmitter algorithm and a target distribution and the second variable comprises the information transfer rate.

The information transfer rate may be based on the sum of mutual information between the one or more inputs and an output of the channel.

Generating updated parameters of the transmission system may comprise updating the parameters of the transmitter algorithm.

The receiver algorithm may include trainable parameters. Further, generating updated parameters of the transmission system may comprise updating the parameters of both the transmitter algorithm and the receiver algorithm.

The means for generating updated parameters of the transmission system may update said parameters using stochastic gradient descent.

The one or more inputs may be outputs of a channel encoder of the transmitter. For example, the outputs of the channel encoder may be K-bit data vectors.

The data symbols may correspond to constellation positions of a modulation scheme implemented by a modulator of said transmitter. The modulator may convert data symbols into transmit symbols in accordance with a modulation scheme. Further, generating updated parameters of the transmission system may comprise generating updated parameters of said modulator.

The receiver algorithm may further comprise means for estimating the one or more inputs.

The said means may comprise: at least one processor; and at least one memory including computer program code, the at least one memory and the computer program configured, with the at least one processor, to cause the performance of the apparatus.

In a third aspect, this specification describes a method comprising using a transmitter algorithm to convert one or more inputs at a transmitter of a transmission system into one or more data symbols, wherein: the transmission system comprises the transmitter implementing said transmitter algorithm, a channel and a receiver including a receiver algorithm; the transmitter algorithm comprises trainable parameters for converting one or more received data symbols into one or more outputs; and the transmitter algorithm is stochastic. Some embodiments further comprise generating updated parameters of the transmission system in order to maximise an information transfer rate. The transmitter may comprise a transmitter neural network configured to implement the said transmitter algorithm. Alternatively, or in addition, the receiver may comprise a receiver neural network configured to implement said receiver algorithm.

In a fourth aspect, this specification describes a method comprising: initialising trainable parameters of a transmission system, wherein the transmission system comprises a transmitter, a channel and a receiver, wherein the transmitter includes a transmitter algorithm for converting one or more inputs into one or more data symbols and the receiver algorithm includes a receiver algorithm for converting one or more received data symbols into one or more outputs, wherein the transmitter algorithm is stochastic; generating updated parameters of the transmission system in order to maximise an information transfer rate, wherein generating updated parameters of the transmission system includes updating trainable parameters of the transmitter algorithm; and repeating the generating updated parameters of the transmission system until a first condition is reached. Initialising the trainable parameters of the transmission system may comprise initialising said trainable parameters randomly. The transmitter may comprise a transmitter neural network configured to implement the said transmitter algorithm. Alternatively, or in addition, the receiver may comprise a receiver neural network configured to implement said receiver algorithm.

Generating updated parameters of the transmission system may comprise generating said parameters in order to minimise a divergence between a distribution function defining a probability that individual data symbols are output by the transmitter algorithm and a target distribution. The distribution function may approximate a desired function.

Some embodiments further comprise generating a loss function, wherein the means for generating updated parameters of the transmission system is configured to minimise said loss function. Moreover, some embodiments further comprise: generating one or more data symbols for transmission from said transmitter to said receiver; observing channel outputs at said receiver in response to transmitting said data symbols; and minimising said loss function on the basis of said observed channel outputs. The loss function may be based (at least in part) on a first variable minus a second variable.

The information transfer rate may be based on the sum of mutual information between the one or more inputs and an output of the channel.

Generating updated parameters of the transmission system may comprise updating the parameters of the transmitter algorithm.

The receiver algorithm may include trainable parameters. Further, generating updated parameters of the transmission system may comprise updating the parameters of both the transmitter algorithm and the receiver algorithm.

The data symbols may correspond to constellation positions of a modulation scheme implemented by a modulator of said transmitter. The modulator may convert data symbols into transmit symbols in accordance with a modulation scheme. Further, generating updated parameters of the transmission system may comprise generating updated parameters of said modulator.

In a fifth aspect, this specification describes an apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a computer readable medium comprising program instructions stored thereon for performing at least the following: using a transmitter algorithm to convert one or more inputs at a transmitter of a transmission system into one or more data symbols, wherein: the transmission system comprises the transmitter implementing said transmitter algorithm, a channel and a receiver including a receiver algorithm; the transmitter algorithm comprises trainable parameters for converting one or more received data symbols into one or more outputs; and the transmitter algorithm is stochastic.

In an eighth aspect, this specification describes a computer readable medium comprising program instructions stored thereon for performing at least the following: initialise trainable parameters of a transmission system, wherein the transmission system comprises a transmitter, a channel and a receiver, wherein the transmitter includes a transmitter algorithm for converting one or more inputs into one or more data symbols and the receiver algorithm includes a receiver algorithm for converting one or more received data symbols into one or more outputs, wherein the transmitter algorithm is stochastic; generate updated parameters of the transmission system in order to maximise an information transfer rate, wherein generating updated parameters of the transmission system includes updating trainable parameters of the transmitter algorithm; and repeat the generating updated parameters of the transmission system until a first condition is reached.

In a ninth aspect, this specification describes a computer program comprising instructions for causing an apparatus to perform at least the following: using a transmitter algorithm to convert one or more inputs at a transmitter of a transmission system into one or more data symbols, wherein: the transmission system comprises the transmitter implementing said transmitter algorithm, a channel and a receiver including a receiver algorithm; the transmitter algorithm comprises trainable parameters for converting one or more received data symbols into one or more outputs; and the transmitter algorithm is stochastic.

In a tenth aspect, this specification describes a computer program comprising instructions for causing an apparatus to perform at least the following: initialise trainable parameters of a transmission system, wherein the transmission system comprises a transmitter, a channel and a receiver, wherein the transmitter includes a transmitter algorithm for converting one or more inputs into one or more data symbols and the receiver algorithm includes a receiver algorithm for converting one or more received data symbols into one or more outputs, wherein the transmitter algorithm is stochastic; generate updated parameters of the transmission system in order to maximise an information transfer rate, wherein generating updated parameters of the transmission system includes updating trainable parameters of the transmitter algorithm; and repeat the generating updated parameters of the transmission system until a first condition is reached.

In an eleventh aspect, this specification describes an apparatus comprising: at least one processor; and at least one memory including computer program code which, when executed by the at least one processor, causes the apparatus to: use a transmitter algorithm to convert one or more inputs at a transmitter of a transmission system into one or more data symbols, wherein: the transmission system comprises the transmitter implementing said transmitter algorithm, a channel and a receiver including a receiver algorithm; the transmitter algorithm comprises trainable parameters for converting one or more received data symbols into one or more outputs; and the transmitter algorithm is stochastic.

In a twelfth aspect, this specification describes an apparatus comprising: at least one processor; and at least one memory including computer program code which, when executed by the at least one processor, causes the apparatus to: initialise trainable parameters of a transmission system, wherein the transmission system comprises a transmitter, a channel and a receiver, wherein the transmitter includes a transmitter algorithm for converting one or more inputs into one or more data symbols and the receiver algorithm includes a receiver algorithm for converting one or more received data symbols into one or more outputs, wherein the transmitter algorithm is stochastic; generate updated parameters of the transmission system in order to maximise an information transfer rate, wherein generating updated parameters of the transmission system includes updating trainable parameters of the transmitter algorithm; and repeat the generating updated parameters of the transmission system until a first condition is reached.

In a thirteenth aspect, this specification describes an apparatus comprising: a transmitter control module comprising a transmitter algorithm for converting one or more inputs at a transmitter of a transmission system into one or more data symbols, wherein: the transmission system comprises the transmitter implementing said transmitter algorithm, a channel and a receiver including a receiver algorithm; the transmitter algorithm comprises trainable parameters for converting one or more received data symbols into one or more outputs; and the transmitter algorithm is stochastic.

In a fourteenth aspect, this specification describes an apparatus comprising: an initialisation module configured to initialise trainable parameters of a transmission system, wherein the transmission system comprises a transmitter, a channel and a receiver, wherein the transmitter includes a transmitter algorithm for converting one or more inputs into one or more data symbols and the receiver algorithm includes a receiver algorithm for converting one or more received data symbols into one or more outputs, wherein the transmitter algorithm is stochastic; a parameter updating module configured to generate updated parameters of the transmission system in order to maximise an information transfer rate, wherein generating updated parameters of the transmission system includes updating trainable parameters of the transmitter algorithm; and a control module configured to repeat the generating updated parameters of the transmission system until a first condition is reached.

BRIEF DESCRIPTION OF THE DRAWINGS

Example embodiments will now be described, by way of non-limiting examples, with reference to the following schematic drawings, in which.

DETAILED DESCRIPTION

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Figure 1:
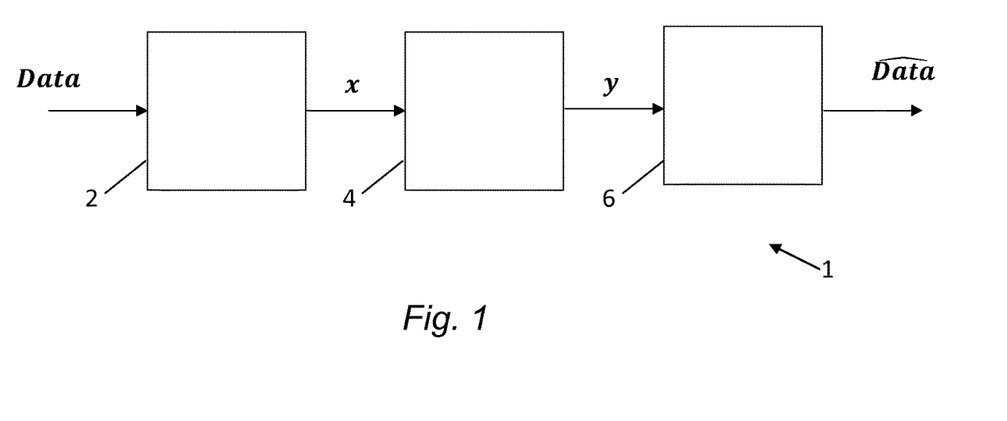
FIG. 1 is a block diagram of an example end-to-end communication system in accordance with an example embodiment.

FIG. 1 is a block diagram of an example end-to-end communication system, indicated generally by the reference numeral 1, in accordance with an example embodiment. The system 1 includes a transmitter 2, a channel 4 and a receiver 6. Viewed at a system level, the system 1 converts data received at the input to the transmitter 2 into an estimate of that data at the output of the receiver 6. More specifically, the transmitter 2 converts the input bits (data) into transmit symbols (x) for transmission over the channel 4 and the receiver 6 generates the output bits ($\widehat{data}$) from symbols (y) received from the channel 4. In at least some embodiments, a channel model may be unavailable.

Figure 2:
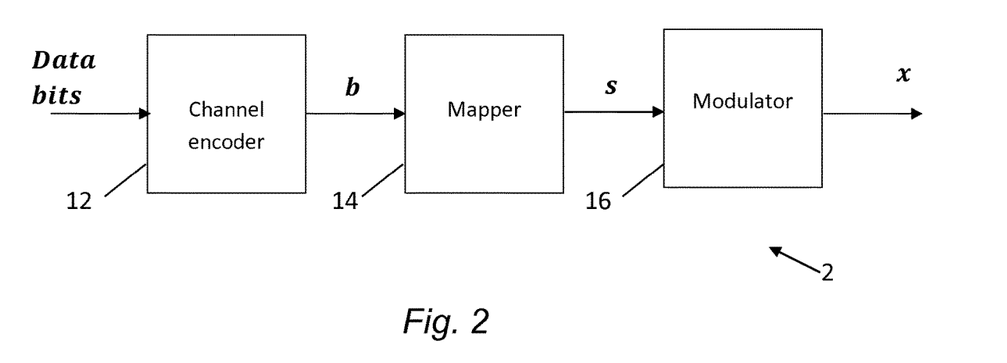
FIG. 2 is a block diagram of an example transmitter that may be used in the communication system of FIG. 1.

FIG. 2 is a block diagram of an example transmitter 2 that may be used in the communication system 1 described above. As shown in FIG. 2, the transmitter 2 includes a channel encoder 12, a bit-to-symbols mapper module 14 and a modulator 16.

The channel encoder 12 receives data for transmission and encodes that data in some way. For example, the channel encoder may be a low-density parity-check code (LDPC) encoder that encodes the received data with parity bits. Other coding schemes (such as polar coding) could be implemented instead of (or in addition to) LDPC encoding.

The bits-to-symbols mapper 14 receives the encoded data bits (b) and converts those bits into data symbols (s) for transmission. For example, the encoded data bits (b) may take the form of a data stream, which data stream is packaged for transmission by the bits-to-symbol mapper 14.

The modulator 16 converts the data symbols into transmit symbols (x) in accordance with a modulation scheme. The transmit symbols are then transmitted over the channel 4 and received at the receiver 6 as received symbols (y). The modulator 16 maps symbols s to constellation points in the complex plane x∈C. Modulation can, for example, be performed using schemes such as QAM; however many other schemes, including higher modulation schemes where x∈$C^r$ with r≥2, may be used. As described below, the modulation scheme itself may be trainable.

Figure 3:
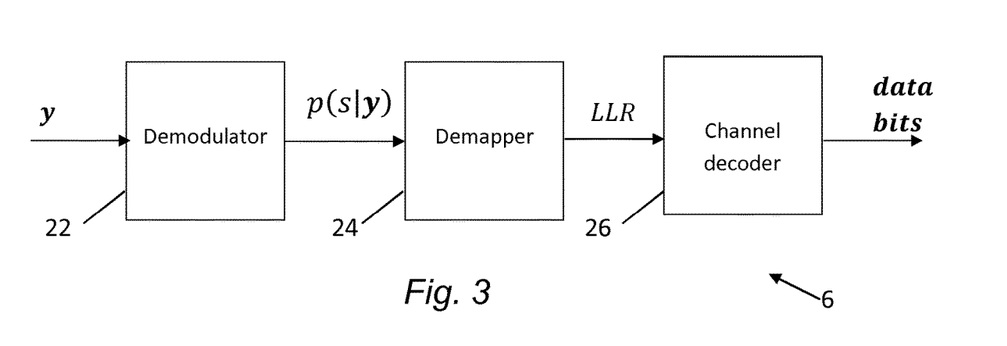
FIG. 3 is a block diagram of an example receiver that may be used in the to communication system of FIG. 1.

FIG. 3 is a block diagram of an example receiver 6 that may be used in the communication system 1 described above. As shown in FIG. 3, the receiver 6 includes a demodulator 22, a demapper module 24 and a channel decoder 26. The demodulator 22 converts the received symbols (y) into symbol probabilities p (s|y) and the demapper module 24 converts the symbol probabilities into log likelihood ratios (LLRs), as discussed further below. The channel decoder 26 seeks to reconstruct the original data bits from the output of the demapper module 24 (for example, on the basis of LDPC coding, polar coding and/or other coding schemes).

A number of modulation techniques could be used in the implementation of the modulator 16 (and the demodulator 22). These include amplitude shift keying (ASK) in which the amplitude of a carrier signal is modified based on a signal being transmitted and phase shift keying (PSK) in which the phase of a carrier signal is modified based on a signal being transmitted. By way of example, quadrature phase shift keying (QPSK) is a form of phase shift keying in which two bits are modulated at once, selecting one of four possible carrier phases shifts (e.g. 0, +90 degree, 180 degrees, −90 degrees). Such carrier phase and amplitudes are often represented as constellation positions in a complex plane.

Figure 4:
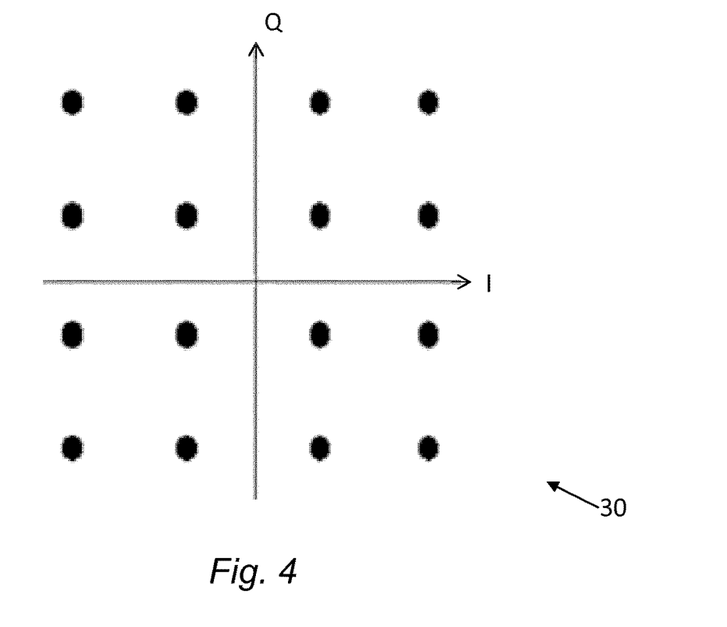
FIG. 4 is a representation of a modulation scheme used in example embodiments.

By way of example, FIG. 4 is a representation, indicated generally by the reference numeral 30, of a quadrature amplitude modulation (QAM) scheme used in example embodiments. The QAM representation 30 includes 16 points, plotted on in-phase (I) and quadrature (Q) axes. Thus, in the example representation 30, 16 symbols can be modulated in different ways by a modulator (such as the modulator 16 of the transmitter 2 described above). The skilled person will be aware of many other suitable modulation techniques.

The choice of modulation scheme used to transmit information such as the communication system 1 may have an impact on the end-to-end performance of such communication systems. Moreover, such modulation schemes may be optimised. For example, the relative frequency with which different constellation points of a particular modulation scheme are used may be optimised (for example, using probabilistic shaping).

In the event that a probability distribution with which constellation symbols should occur to maximize the information rate has been identified, it remains a challenge to map bits from an incoming bit-stream to constellation symbols, so that the constellation symbols occur with the target probabilities.

Figure 5:
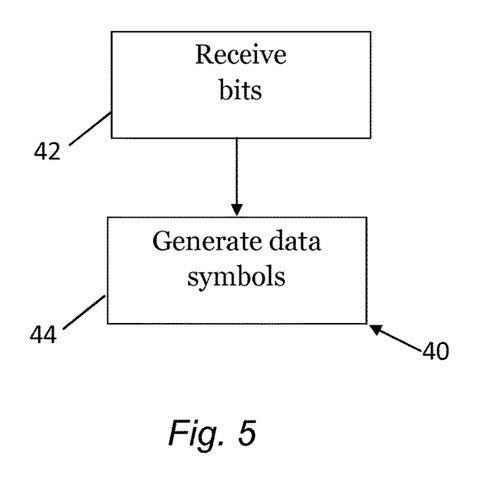
FIGS. 5 to 8 are flow charts showing algorithm in accordance with example embodiments.

FIG. 5 is a flow chart showing an algorithm, indicated generally by the reference numeral 40, in accordance with an example embodiment. The algorithm 40 may be implemented by the bits-to-symbol mapper module 14 of the transmitter 2 described above.

The algorithm 40 starts at operation 42, where bits for transmission are received by the bits-to-symbol mapper 14. The module 14 may comprise a transmitter algorithm (e.g. a trainable transmitter algorithm) for converting one or more received bits into one or more outputs. As described in detail below, the transmitter algorithm implemented by the bits-to-symbol mapper 14 is stochastic.

At operation 44, data symbols are generated based on the bits received in operation 42. In the example transmitter 2, the generated data symbols are provided to the modulator 16 for transmission over the channel 4.

Thus, the bits-to-symbols mapper 14 may be provided to map bits from an incoming bit-stream (b) to a sequence of constellation symbols such that constellation symbols occur with probabilities p(s) close to a target distribution p*(s). The incoming bit-stream is typically the output of a channel encoder 12, and the generated constellation symbols are typically mapped to constellation points in the complex plane by the modulator 16, according to some constellation scheme, such as QAM, PSK or ASK, as discussed above. The target distribution p*(s) may be chosen such that it maximizes the information rate.

The operation 44 may implement fixed-to-fixed length mapping, such that each bit vector b of K bits is mapped to a constellation symbol $s \in \mathcal{S}$, where $\mathcal{S} = \{1, \ldots, M\}$ and M is the modulation order.

The bit vector b is mapped to constellation symbols from S in a stochastic manner, i.e., a bit vector b is randomly mapped to a symbol s E S according to a distribution p (s|b). The set of conditional distribution $\{p(s|b)\}_{b \in \{0,1\}^K}$ may be such that that the probability of occurrence of a symbol $s \in \mathcal{S}$ is given by:

$$p(s) = \Sigma_{b \in \{0,1\}^K} P(s|b) p(b) \quad (1)$$

where the summation is over all possible binary vectors of length K, and p(s) is close to a target distribution p*(s), which is assumed to maximize the information rate.

As discussed below, the cumulative information between the bits $b_k$, k=1 . . . K and the channel output y should be high so that demapping and decoding is possible.

As also discussed below, the conditional distributions p(s|b) that satisfy the previously mentioned conditions may be computed using stochastic gradient descent (SGD).

Figure 6:
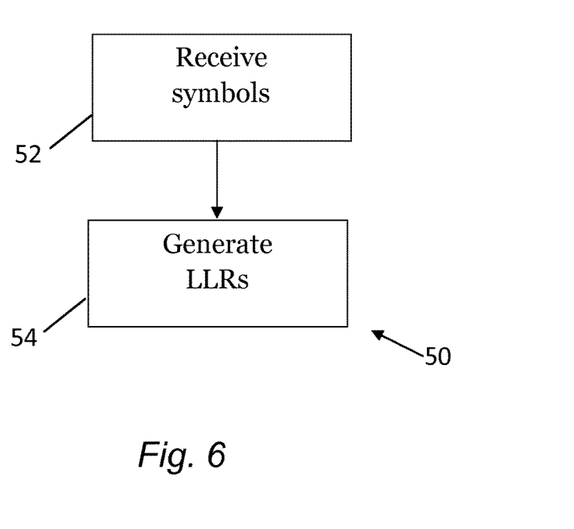

FIG. 6 is a flow chart showing algorithm, indicated generally by the reference numeral 50, in accordance with an example embodiment.

The algorithm 50 starts at operation 52, where symbols are received at the receiver 6 from the channel 4. At operation 54, the bits-to-symbols demapper module 24 of the receiver 6 is used to generate log-likelihood ratios based on the received data.

Thus, the demapper module 24 maps a probability distribution over the set of symbols $\mathcal{S}$ conditional to the received signal y into bits log-likelihood ratio (LLR), i.e., $$LLR_i = \log \frac{p(b_i = 0 \mid y)}{p(b_i = 1 \mid y)}, \sim i \in \{1, \ldots, K\}. \quad (2)$$

Assuming equiprobable independent and identically distributed (iid) data bits, $p(b_i) = \frac{1}{2}$ that the receiver has knowledge of the conditional distributions $\{p(s|b)\}_{b \in \{0,1\}^K}$ and that a demodulator provides p(s|y), then $p(b_i|y)$, for $i \in \{1, \ldots, K\}$, can be computed as follows:

$$p(b_i = 0 \mid y) = \frac{1}{M} \sum_{s \in S} \frac{p(s \mid y)}{p(s)} \sum_{b \in \{0,1\}^K : b_i = 0} p(s \mid b), \text{ and} \quad (3)$$

$$p(b_i = 1 \mid y) = \frac{1}{M} \sum_{s \in S} \frac{p(s \mid y)}{p(s)} \sum_{b \in \{0,1\}^K : b_i = 1} p(s \mid b), \quad (4)$$

where p(s) is computed as in (1), and from which LLRs can be computed according to (2).

The stochastic bits-to-symbols mapper 14 outputs symbols drawn randomly from S according to a distribution p(s|b) conditional to its input b. A challenge is the computation of the conditional distributions $\{p(s|b)\}_{b \in \{0,1\}^K}$ for the $2^K$ possible input bit vectors.

The distribution $\{p(s|b)\}_{b \in \{0,1\}^K}$ can be computed by a neural network (NN) with parameters θ from an input such as the channel state information (CSI). The distribution can also be directly optimized, in which case $\theta=\{p(s|b)\}_{b\in\{0,1\}^K}$. Assuming a target distribution $p^*(s)$ which seeks to maximize the information rate has been defined, the set of conditional distributions $\{p(s|b)\}_{b\in\{0,1\}^K}$ should be such that:

The constellation symbols distribution (1) is close to the target distribution $p^*(s)$; and The information carried by the channel output y on the input bits $\{b_K\}_{k=1\ldots K}$ is high enough to enable demapping.

These two conditions are formalized by the following loss function:

$$\mathcal{L}(\theta) = D_{KL}(p(s)\|p^*(s)) - \Sigma_{k=1}^K I(b_k; y) \qquad (5)$$

The first term of the loss function ($D_{KL}(p(s)\|p^*(s))$) measures the divergence between the symbol's distribution (1) and the target distribution using the Kullback-Leibler (KL) divergence. Other divergence measurements that determine a divergence between a distribution function defining a probability that individual data symbols are output by the transmitter algorithm and a target distribution are possible.

The second term of the loss function ($\Sigma_{k=1}^K I(b_k; y)$) is the sum of the mutual information (MIs) between the bits $b_k$ and the channel output y.

In one embodiment, the KL divergence can be exactly computed as follows:

$$D_{KL}(p(s)\|p^*(s)) = \sum_{s\in S} p(s)\log\frac{p(s)}{p^*(s)} \qquad (6)$$

The mutual information (MI) may be estimated by:

$$I(b_k; y) \approx 1 + \frac{1}{B}\sum_{j=1}^{B}\sum_{b_k\in\{0,1\}} p(b_k | y^{(j)})\log p(b_k | y^{(j)}) \qquad (7)$$

where B is the batch-size, i.e., the number of samples used to estimate the mutual information, $\{y^{(i)}, \sim j=1\ldots B\}$ are samples of the channel output, and $$p(b_k = v | y^{(j)}) = \frac{1}{M}\Sigma_{s\in S}\frac{p(s | y^{(j)})}{p(s)}\sum_{b\in\{0,1\}^K: b_k=v} p(s | b) \qquad (8)$$

Other mechanisms for determining the information transfer rate for use in the loss function (5) are possible.

Figure 7:
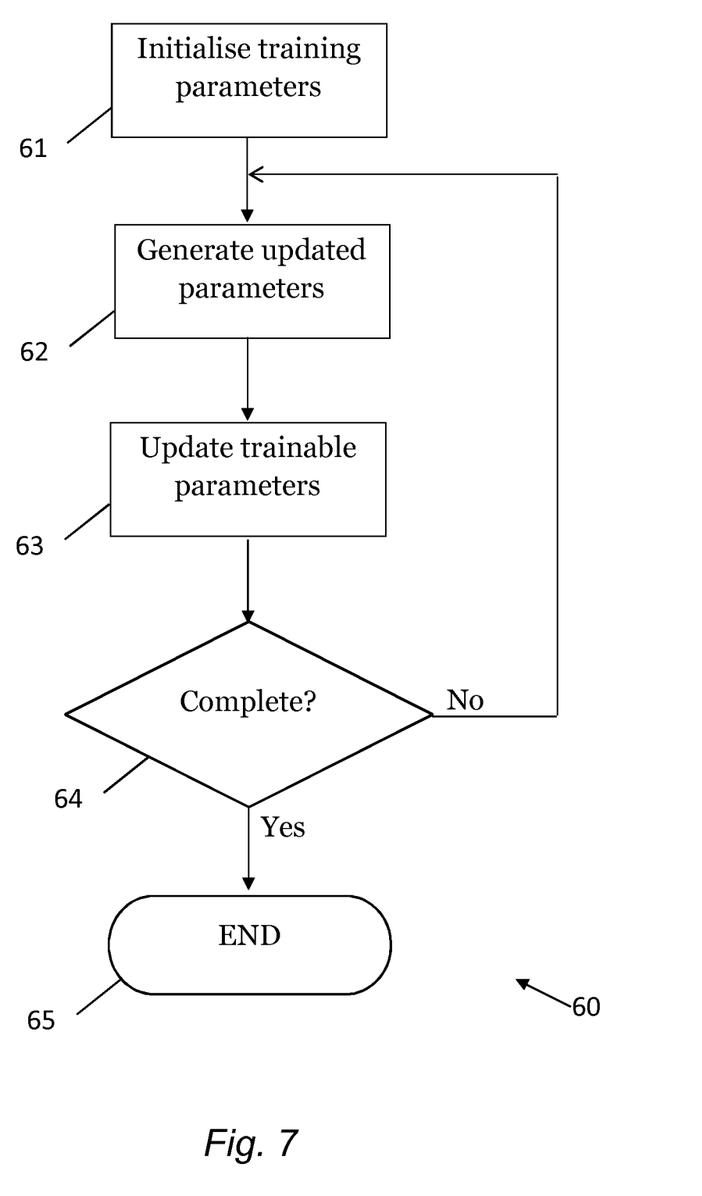

FIG. 7 is a flow chart showing an algorithm, indicated generally by the reference numeral 60, in accordance with an example embodiment. The algorithm 60 is directed to the training of a transmission system 1 (e.g. the transmitter 2 of the transmission system). The transmission system comprises a transmitter, a channel and a receiver, wherein the transmitter includes a stochastic transmitter algorithm for converting one or more inputs into one or more data symbols (i.e. symbols for transmission).

The algorithm 60 starts at operation 61, where trainable parameters of a transmission system (such as the transmission system 1) are initialised. The initialisation of the trainable parameters may be random, or may be implemented in some other way (e.g. based on a defined start point or a previous implementation). The trainable parameters may include trainable parameters of a transmitter algorithm.

Alternatively, or in addition, the trainable parameters may include trainable parameters of one or more of a modulator of the transmitter and/or a receiver algorithm.

At operation 62, updated trainable parameters are generated. For example, the trainable parameters may be updated in order to maximise an information transfer rate (e.g. as defined by the equation (7) above). Alternatively, or in addition, the trainable parameters may be updated in order to minimise a divergence between a distribution function defining a probability that individual data symbols are output by the transmitter algorithm and a target distribution. The trainable parameters may be updated by minimising a loss function (e.g. using stochastic gradient descent).

By way of example, the operation 62 may be implemented by generating one or more data symbols for transmission from the transmitter 2 to the receiver 6 of the transmissions system 1, observing channel outputs at the receiver in response to transmitting said data symbols, and minimising said loss function on the basis of said observed channel outputs.

At operation 63, the relevant trainable parameters are updated based on the updated parameters generated in operation 62.

At operation 64, it is determined whether the algorithm 60 is complete. The algorithm 60 may be deemed to be complete if a first condition is reached. The first condition may take many forms, such as a defined performance level, a defined number of iterations or when an estimate loss function has not decreased beyond a threshold amount during a fixed number of iterations.

If the algorithm is deemed to be complete, the algorithm terminates at operation 65; otherwise the algorithm returns to operation 62.

Figure 8:
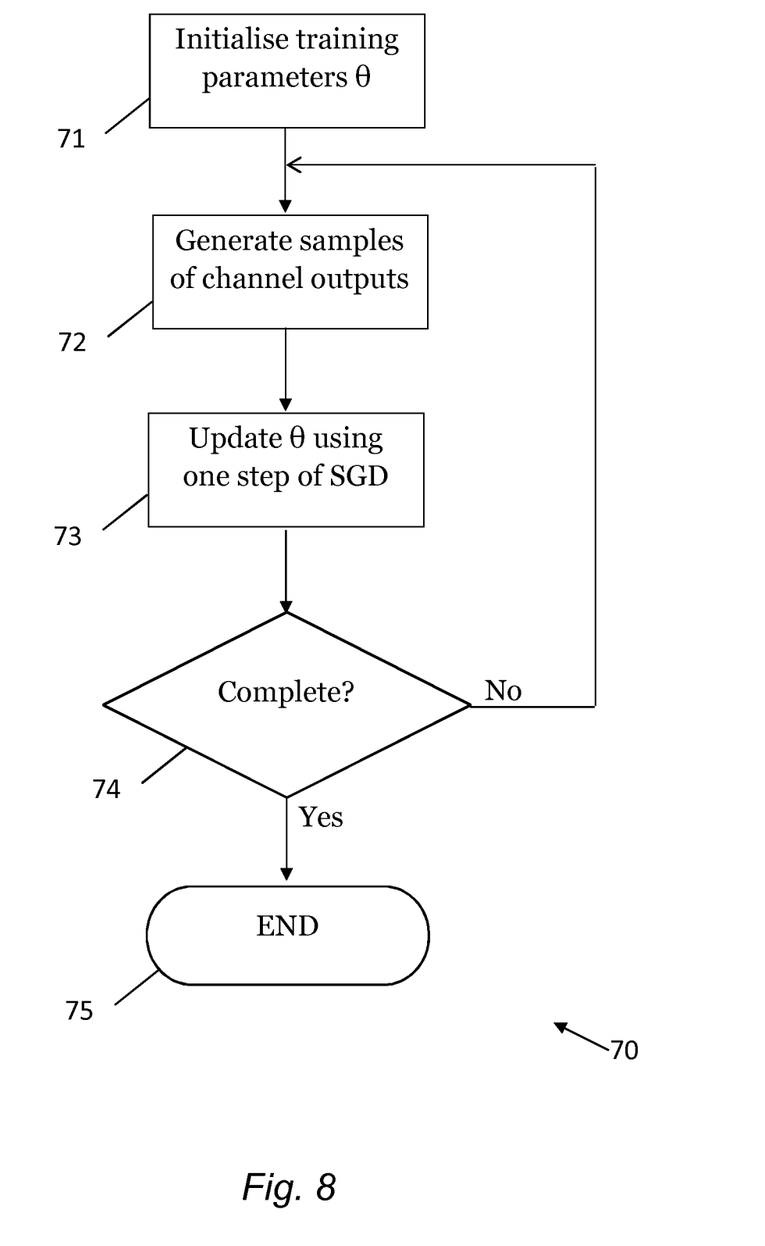

FIG. 8 is a flow chart showing algorithm, indicated generally by the reference numeral 70, in accordance with an example embodiment. The algorithm 70 is directed to the training of a transmission system 1 (e.g. the transmitter 2 of the transmission system). The transmission system comprises a transmitter, a channel and a receiver, wherein the transmitter includes a stochastic transmitter algorithm for converting one or more inputs into one or more data symbols (i.e. symbols for transmission).

The algorithm 70 starts at operation 71, where the trainable parameters $\theta$ are initialised. The initialisation of the trainable parameters may be random, or may be initialised in some other way (e.g. to a defined start point or a previous implementation). The trainable parameters may include trainable parameters of a transmitter algorithm. Alternatively, or in addition, the trainable parameters may include trainable parameters of one or more of a modulator of the transmitter and/or a receiver algorithm.

At operation 72, B samples of the channel output $y^{(i)}$, $\sim j=1\ldots B$ are generated as follows.

Randomly sample B samples of bit vectors b such that bits are equiprobable and independent and identically distributed (iid).

For each bit vector b, randomly generate a constellation symbol $s\sim p(s|b)$.

Transmit the constellation symbols over the channel and observe y.

At operation 73, the trainable parameters $\theta$ are updated by performing one step of stochastic gradient descent (SGD) on the estimated loss:

$$\mathcal{L}(\theta) \approx D_{KL}(p(s)\|p^*(s)) - K - \frac{1}{B}\sum_{k=1}^{K}\sum_{j=1}^{B}\sum_{b_k\in\{0,1\}} p(b_k | y^{(j)})\log p(b_k | y^{(j)})$$

where $p(b_k|y)$ is computed according to (8) and $D_{KL}$ according to (6).

At operation 74, it is determined whether the algorithm 70 is complete. The algorithm 70 may be deemed to be complete if a first condition is reached. The first condition may take many forms, such as a defined performance level, a defined number of iterations or when an estimate loss function has not decreased beyond a threshold amount during a fixed number of iterations.

If the algorithm is deemed to be complete, the algorithm terminates at operation 75; otherwise the algorithm returns to operation 72.

As described above, the generation of update parameters in the operations 62 and 72 may seek to maximise an information transfer rate and/or to minimise a divergence (e.g. using Kullback-Leibler divergence) between a distribution function defining a probability that individual data symbols are output by the transmitter algorithm and a target distribution. The information transfer rate may be maximised in order to increase the likelihood of the information carried by the channel output y on the input bits $\{b_k\}_{k=1\ldots K}$ is high enough to enable demapping. The divergence may be minimised such that a distribution of constellation symbols outputs by the transmitter is dose to a target distribution $p^*(s)$.

The trainable parameters of the algorithms 60 and 70 may be trained by minimising a loss function based (at least in part) on a first variable minus a second variable, wherein the first variable comprises a divergence between a distribution function defining a probability that individual data symbols are output by the transmitter algorithm and a target distribution and the second variable comprises the information transfer rate (e.g. a sum of mutual information between the one or more inputs and an output of the channel).

As described above, generating updated parameters (e.g. operations 62 and 72 of the algorithms 60 and 70) may generate updated parameters of a transmitter algorithm. Alternatively, or in addition, generating updated parameters may involve generating updated parameters of a receiver algorithm and/or generating updated parameters of a modulator of the transmitter.

The algorithms 60 and 70 include operations (the operations 64 and 74) in which it is determined whether the relevant algorithm is complete. These operations may be implemented in many different ways. These include stopping after a given number of iterations, stopping when the loss function is below a defined below, or stopping in the event that the loss function does not increase significantly during a defined number of iterations. The skilled person will be aware of many alternative implementations of the operations 64 and 74.

The transmitter may be implemented using a transmitter neural network configured to implement said transmitter algorithm. Alternatively, or in addition, the receiver may be implemented using a received neural network configured to implement said receiver algorithm.

Figure 9:
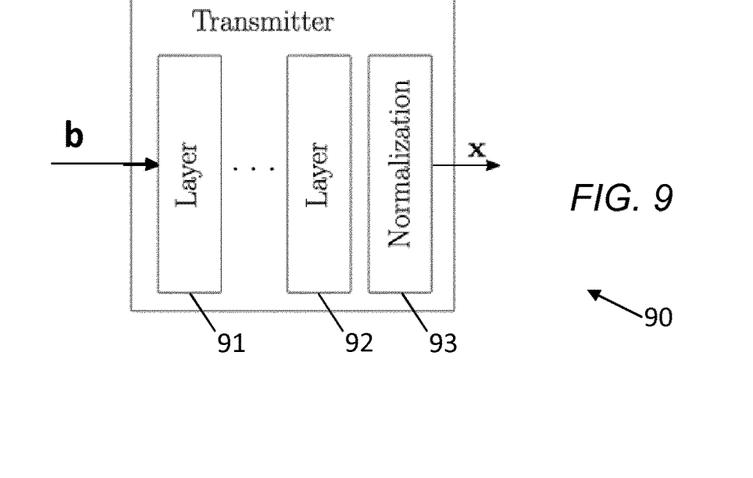
FIG. 9 is a block diagram of an example transmitter module in accordance with an example embodiment.

FIG. 9 is a block diagram of an example transmitter module, indicated generally by the reference numeral 90, in accordance with an example embodiment. The transmitter 90 implements a transmitter algorithm and may, for example, implement the bits-to-symbols mapper 14 of the transmitter 1 described above. As shown in FIG. 9, the transmitter 90 includes a dense layer of one or more units 91, 92 (e.g. including one or more neural networks) and a normalization module 93. The dense layers 91, 92 may include an embedding module. The modules within the transmitter 90 are provided by way of example and modifications are possible. The transmitter module 90 is one of many example configurations that could be provided; the skilled person will be aware of many possible variants.

Figure 10:
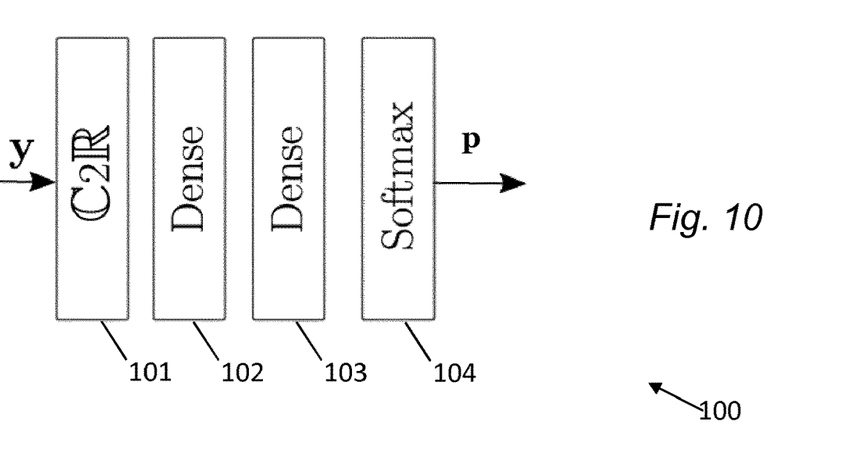
FIG. 10 is a block diagram of an example receiver module in accordance with an example embodiment.

FIG. 10 is a block diagram of an example receiver module, indicated generally by the reference numeral 100, in accordance with an example embodiment. The receiver 100 implements a receiver algorithm and may, for example, implement the demodulator module 22 of the receiver 6 described above. The receiver module 100 comprises a complex-to-real conversion module 101, first and second dense layers 102, 103 (e.g. including one or more neural networks) and a softmax layer 104. The output of the softmax later 104 is a probability function. The provision of two dense layers in the system 100 is an example only; any number of dense layers could be provided. The receiver module 100 is one of many example configurations that could be provided; the skilled person will be aware of many possible variants.

The complex-to-real conversion module 101 converts a received vector y into real values. This can be done, for example, by concatenating the real and imaginary parts of a sample to obtain a vector that takes values in $\mathbb{R}^{2M}$.

Many variants for implementing the receiver are possible. For example, the receiver may include a demapper and a demodulator that are implemented as a single neural network with trainable parameters optimized jointly with θ at training.

Figure 11:
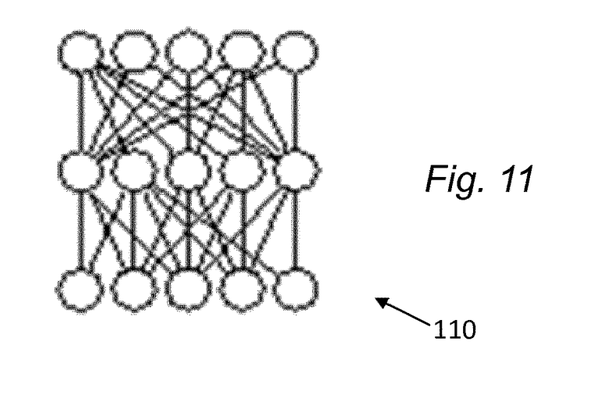
FIG. 11 shows an example neural network that may be used in example embodiments.

FIG. 11 shows an example neural network 110 that may be used in one or more example embodiments. The neural network 110 comprises a plurality of interconnected nodes arranged in a plurality of layers. A neural network, such as the network 110, can be trained by adjusting the connections between nodes and the relative weights of those connections. As noted above, the transmitter and receiver algorithms may be implemented using one of more neural networks, such as a neural network having the form of the neural network 110.

As described above, the transmitter may include a bits-to-symbols mapper 14 that is configured to map bits from an incoming bit-stream (b) to a sequence of constellation symbols such that constellation symbols occur with probabilities p(s) close to a target distribution $p^*(s)$. The target distribution $p^*(s)$ may be chosen such that it maximizes the information rate.

Figure 12:
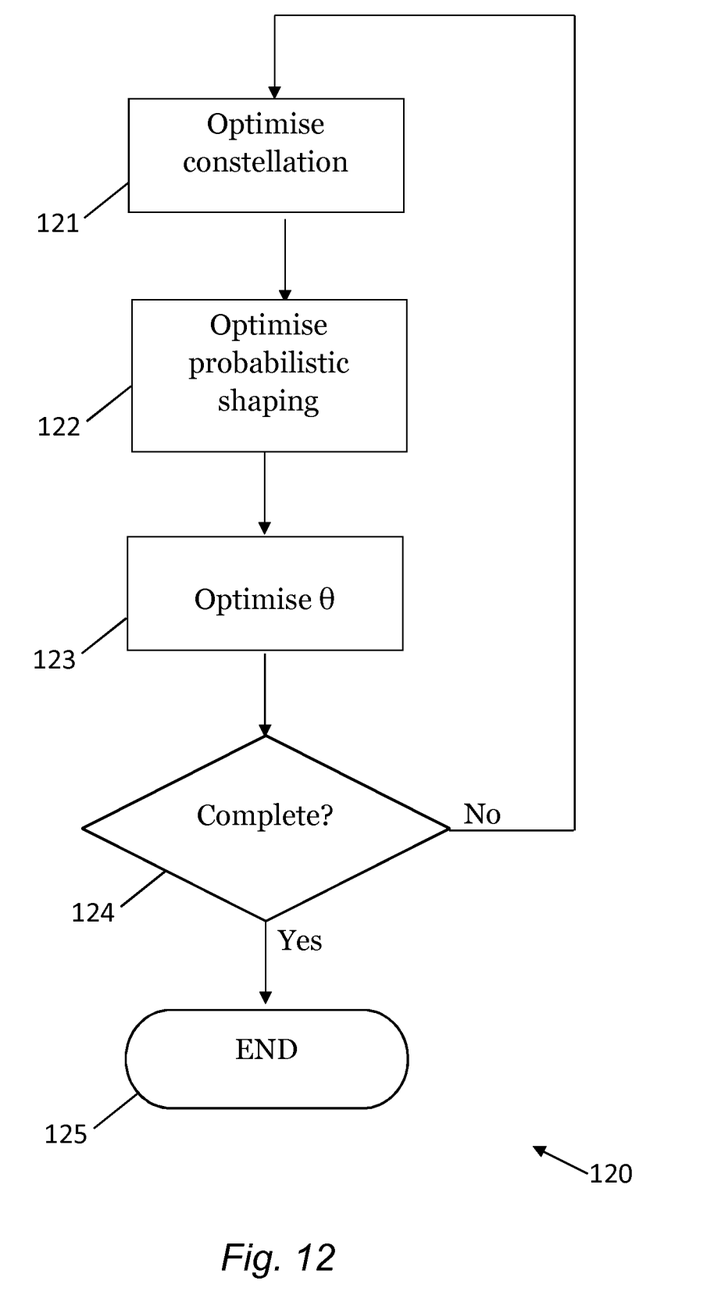
FIG. 12 is a flow chart showing an algorithm in accordance with an example embodiment.

FIG. 12 is a flow chart showing an algorithm, indicated generally by the reference numeral 120, in accordance with an example embodiment.

The algorithm 120 starts at operation 121 where a modulation constellation is optimised. An example constellation is described above with reference to FIG. 4. The constellation may be optimised in order to increase end-to-end performance of a communication system (such as the communication system 1 described above). Constellation optimisation may involve optimising the location of constellation points (so-called geometric shaping). Alternatively, or in addition, constellation optimisation may involve optimising the number of constellation points or selecting an optimum constellation method. The constellation optimising operation 121 may use machine learning principles, for example by optimising the constellation using stochastic gradient descent or similar methodologies.

At operation 122, the frequency with which the various constellation points are sent (so-called probabilistic shaping) is optimised. Probabilistic shaping may be optimised in order to increase end-to-end performance of a communication system (such as the communication system 1 described above). The probabilistic shaping optimising operation 122 may use machine learning principles, for example using stochastic gradient descent or similar methodologies.

The output of the operation 122 may provide the target distribution p*(s) described above.

At operation 123, the trainable parameters of the communication system 1 are updated, for example using the algorithms 60 or 70 described above. Thus, the principles described herein can be applied to a communication system having a modulation scheme optimised in the operations 121 and 122.

At operation 124, it is determined whether the algorithm 120 is complete. The algorithm 120 may be deemed to be complete if a first condition is reached. The first condition may take many forms, such as a defined performance level, a defined number of iterations or when an estimate loss function has not decreased beyond a threshold amount during a fixed number of iterations.

If the algorithm is deemed to be complete, the algorithm terminates at operation 125; otherwise the algorithm returns to operation 121.

Many variants to the algorithm 120 are possible. For example, one or more of the operations 121, 122 and 123 may be omitted and the operations may be provided in any order. Moreover, two or more (e.g. all) of the operations 121, 122 and 123 may be combined, such that multiple parameters are optimised together.

Figure 13:
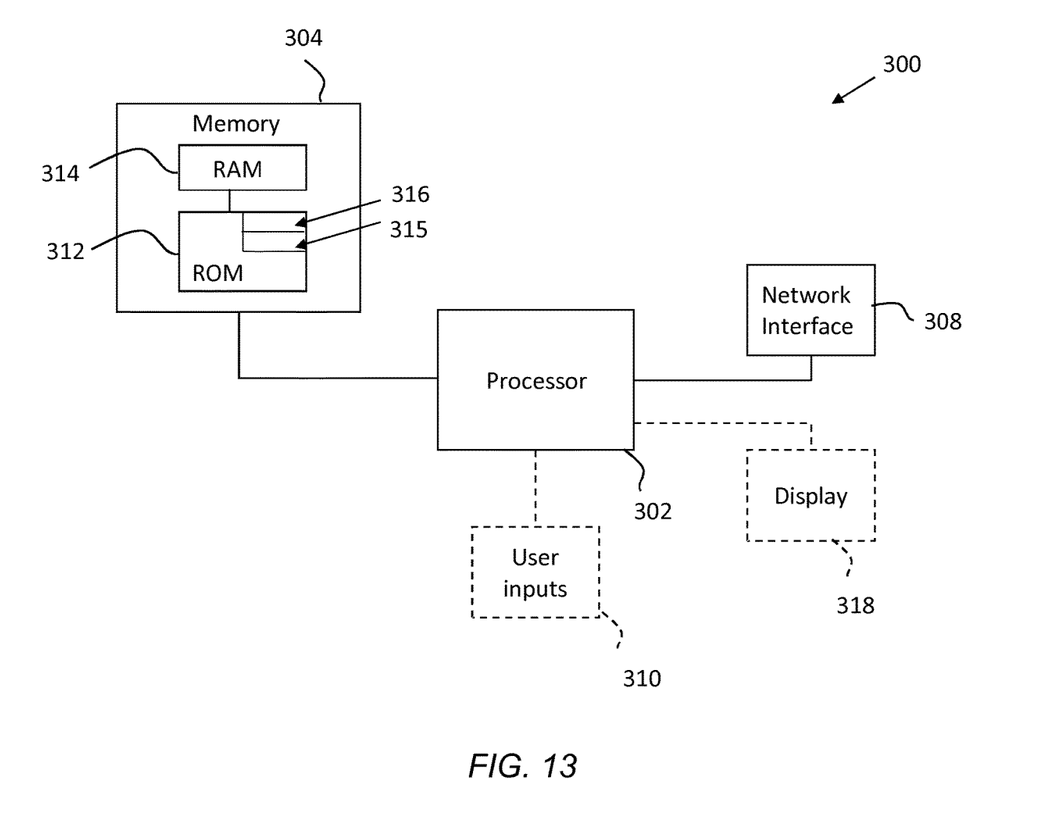
FIG. 13 is a block diagram of a components of a system in accordance with an exemplary embodiment.

For completeness, FIG. 13 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side is apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 40, 50, 60, 70 and 120 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server to device/apparatus in order to utilize the software application stored there.

Figure 14A:
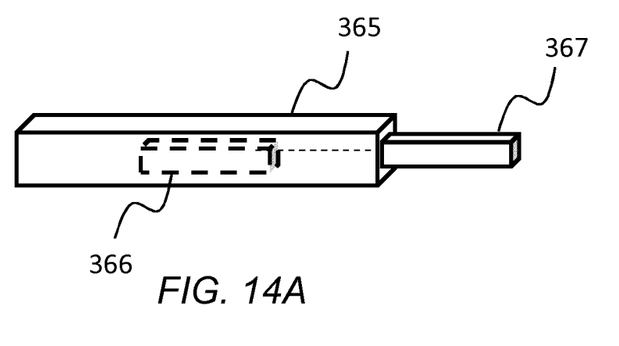
FIGS. 14A and 14B show tangible media, respectively a removable memory unit and a compact disc (CD) storing computer-readable code which when run by a computer perform operations according to embodiments.
Figure 14B:
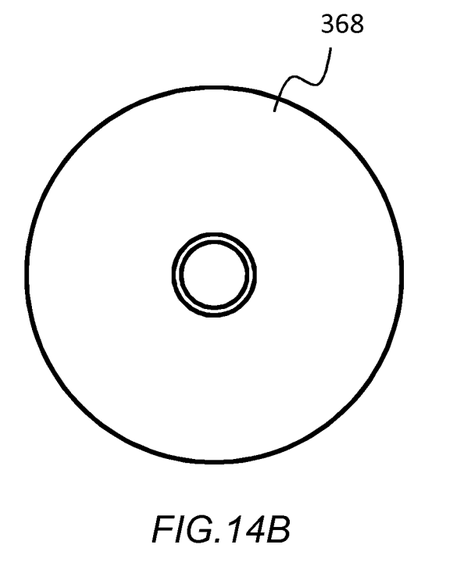

FIGS. 14A and 14B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 5, 6, 7, 8 and 12 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising circuitry configured for using a transmitter algorithm to convert one or more inputs at a transmitter of a transmission system into one or more data symbols, wherein:
the transmission system comprises the transmitter implementing said transmitter algorithm, a channel and a receiver including a receiver algorithm;
the transmitter algorithm comprises trainable parameters for converting one or more received data symbols into one or more outputs; and
the transmitter algorithm is stochastic;
the apparatus comprises circuitry configured for generating updated parameters of the transmission system in order to maximize an information transfer rate and to minimize a divergence between a distribution function defining a probability that individual data symbols are output with the transmitter algorithm and a target distribution.

2. An apparatus comprising:
circuitry configured for initializing trainable parameters of a transmission system, wherein the transmission system comprises a transmitter, a channel and a receiver, wherein the transmitter includes a transmitter algorithm for converting one or more inputs into one or more data symbols and the receiver algorithm includes a receiver algorithm for converting one or more received data symbols into one or more outputs, wherein the transmitter algorithm is stochastic;
circuitry configured for generating updated parameters of the transmission system in order to maximize an information transfer rate, wherein generating updated parameters of the transmission system includes updating trainable parameters of the transmitter algorithm; and
circuitry configured for repeating the generating updated parameters of the transmission system until a first condition is reached.

3. The apparatus as claimed in claim 2, wherein generating the updated parameters of the transmission system comprises generating the updated parameters in order to minimize a divergence between a distribution function defining a probability that individual data symbols are output with the transmitter algorithm and a target distribution.

4. The apparatus as claimed in claim 1, comprising circuitry configured for generating a loss function, wherein the circuitry configured for generating updated parameters of the transmission system is configured to minimize said loss function.

5. The apparatus as claimed in claim 1, further comprising:
circuitry configured for generating one or more data symbols for transmission from said transmitter to said receiver;
circuitry configured for observing channel outputs at said receiver in response to transmitting said data symbols; and
circuitry configured for minimizing a loss function on the basis of said observed channel outputs.

6. The apparatus as claimed in claim 4, wherein the loss function is based on a first variable minus a second variable, wherein the first variable comprises the divergence between the distribution function defining the probability that individual data symbols are output with the transmitter algorithm and the target distribution and the second variable comprises the information transfer rate.

7. The apparatus as claimed in claim 1, wherein the information transfer rate is based on the sum of mutual information between the one or more inputs and an output of the channel.

8. The apparatus as claimed in claim 1, wherein generating updated parameters of the transmission system comprises updating the parameters of the transmitter algorithm.

9. The apparatus as claimed in claim 1, wherein the receiver algorithm includes trainable parameters.

10. The apparatus as claimed in claim 1, wherein generating updated parameters of the transmission system comprises both: updating the parameters of the transmitter algorithm, and updating parameters of the receiver algorithm.

11. The apparatus as claimed in claim 1, wherein said circuitry for generating updated parameters of the transmission system updates said parameters using stochastic gradient descent.

12. The apparatus as claimed in claim 1, wherein the one or more inputs are outputs of a channel encoder of the transmitter.

13. The apparatus as claimed in claim 1, wherein said data symbols correspond to constellation positions of a modulation scheme implemented with a modulator of said transmitter.

14. The apparatus as claimed in claim 1, wherein the transmitter comprises a transmitter neural network configured to implement said transmitter algorithm.

15. The apparatus as claimed in claim 1, wherein the receiver comprises a receiver neural network configured to implement said receiver algorithm.

16. The apparatus as claimed in claim 1, wherein the one or more circuitries comprises:
at least one processor; and
at least one non-transitory memory including computer program code, the at least one memory and the computer program configured, with the at least one processor, to cause the performance of the apparatus.

17. A non-transitory computer readable medium storing a computer program comprising instructions for causing an apparatus to use a transmitter algorithm to convert one or more inputs at a transmitter of a transmission system into one or more data symbols, wherein:
the transmission system comprises the transmitter implementing said transmitter algorithm, a channel and a receiver including a receiver algorithm;

the transmitter algorithm comprises trainable parameters for converting one or more received data symbols into one or more outputs; and the transmitter algorithm is stochastic;

the instructions cause the apparatus to generate updated parameters of the transmission system in order to maximize an information transfer rate and to minimize a divergence between a distribution function defining a probability that individual data symbols are output with the transmitter algorithm and a target distribution.

18. A non-transitory computer readable medium storing a computer program comprising instructions for causing an apparatus to perform at least the following:

initialize trainable parameters of a transmission system, wherein the transmission system comprises a transmitter, a channel and a receiver, wherein the transmitter includes a transmitter algorithm for converting one or more inputs into one or more data symbols and the receiver includes a receiver algorithm for converting one or more received data symbols into one or more outputs, wherein the transmitter algorithm is stochastic;

generate updated parameters of the transmission system in order to maximize an information transfer rate, wherein generating updated parameters of the transmission system includes updating trainable parameters of the transmitter algorithm; and repeat the generating updated parameters of the transmission system until a first condition is reached.

19. The non-transitory computer readable medium as claimed in claim 18, wherein generating the updated parameters of the transmission system comprises generating the updated parameters in order to minimize a divergence between a distribution function defining a probability that individual data symbols are output with the transmitter algorithm and a target distribution.

* * * * *